United States Patent
Arora et al.

(10) Patent No.: US 12,393,943 B2
(45) Date of Patent: Aug. 19, 2025

(54) INTELLIGENT METHOD FOR REAL TIME CACHE UPDATES LEVERAGING DISTRIBUTED LEDGER TECHNOLOGY WITH NON-FUNGIBLE TOKEN (NFT) TIED SYSTEM OF RECORD (SOR) UPDATE INDICATORS

(71) Applicant: Bank of America Corporation, Charlotte, NC (US)

(72) Inventors: Saurabh Arora, Gurugram (IN); Suryanarayana Adivi, Telangana (IN); Durga Prasad Kutthumolu, Telangana (IN); Sunilkumar Sriperambudur, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 36 days.

(21) Appl. No.: 18/376,156

(22) Filed: Oct. 3, 2023

(65) Prior Publication Data
US 2025/0111360 A1  Apr. 3, 2025

(51) Int. Cl.
  G06Q 40/00  (2023.01)
  G06Q 20/38  (2012.01)
  G06Q 20/40  (2012.01)
(52) U.S. Cl.
  CPC ......... *G06Q 20/401* (2013.01); *G06Q 20/389* (2013.01)

(58) Field of Classification Search
  None
  See application file for complete search history.

(56) References Cited

U.S. PATENT DOCUMENTS

| | | | |
|---|---|---|---|
| 9,864,685 B2 | 1/2018 | Zachariassen et al. | |
| 9,880,909 B2 * | 1/2018 | Parakh | G06F 11/1441 |
| 10,210,092 B1 * | 2/2019 | Miao | G06F 13/4068 |
| 10,356,200 B2 * | 7/2019 | Zhang | H04W 4/60 |

OTHER PUBLICATIONS

Kaswan et al., "Freshness Based Cache Updating in Parallel Relay Networks," arXiv:2105.05237v1 [cs.IT], May 11, 2021, 6 pages.
(Continued)

*Primary Examiner* — Olabode Akintola
(74) *Attorney, Agent, or Firm* — Banner & Witcoff, Ltd.

(57) ABSTRACT

Aspects of the disclosure relate to using machine learning models to performing real-time cache updates. A computing system may receive a request to update an unreferenced object of a user interface of an application. A block may be generated in a blockchain stored in a second cache tier. The block may comprise a non-fungible token (NFT) based on the unreferenced object and may indicate that the unreferenced object is not authorized to indicate a system of record update. Based on the request to update the unreferenced object meeting one or more criteria, a block comprising an NFT that is referenced by the unreferenced object may be generated in a first cache tier. A block indicating that the NFT is referenced by the unreferenced object may be generated in a first cache tier and the unreferenced object may be updated in the user interface of the application.

20 Claims, 6 Drawing Sheets

(56) References Cited

OTHER PUBLICATIONS

Yu et al., "A Distributed Adaptive Cache Update Algorithm for the Dynamic Source Routing Protocol," NYU Computer Science Department Technical Report TR2003-842, Jul. 2003. Last revised: Dec. 20, 2004, 12 pages.

Fan et al., "Summary Cache: A Scalable Wide-Area Web Cache Sharing Protocol," IEEE/ACM Transactions on Networking, vol. 8, No. 3, Jun. 2000, 13 pages.

Oh et al., "Caching less for better performance: Balancing cache size and update cost of flash memory cache in hybrid storage systems," 10th USENIX Conference on File and Storage Technologies, 2012, 14 pages.

\* cited by examiner

INTELLIGENT METHOD FOR REAL TIME CACHE UPDATES LEVERAGING DISTRIBUTED LEDGER TECHNOLOGY WITH NON-FUNGIBLE TOKEN (NFT) TIED SYSTEM OF RECORD (SOR) UPDATE INDICATORS

TECHNICAL FIELD

Some aspects of the disclosure relate to using distributed ledger technology and non-fungible tokens (NFTs) to perform real-time updates of a cache for a user interface. In particular, the cache for the user interface may be stored in a cache tier and updated based on validation of unreferenced objects corresponding to a user interface.

BACKGROUND

Various systems may implement user interfaces that are configured to reflect the state of data that may correspond to objects of the user interface. The state of the data may vary from moment to moment and though some of the changes in the data may be continuously reflected in the user interface, other changes in the data may require some further action before being reflected in the user interface. Further, some objects in a user interface may change based on the approval of some other related action. In some cases, certain data is stored in anticipation of later use that may be reflected in the user interface.

Managing data that is frequently accessed and updated may be complex. Further, determining which data to store in short-term storage and which data to store in longer-term storage may require significant expenditure of time and/or resources. As a result, attempting to determine the way in which data is stored may present challenges.

SUMMARY

Aspects of the disclosure provide technical solutions to improve the effectiveness with which a cache may be updated in real-time.

In accordance with one or more embodiments of the disclosure, a computing system for real-time cache updates may comprise a system of record (SOR) database device configured to store one or more SOR updates that are capable of being indicated in a user interface of an application.

The computing system may comprise a distributed ledger system comprising a first cache tier configured to store one or more referenced blocks of a blockchain. The one or more blocks stored in the first cache tier may comprise one or more non-fungible tokens (NFTs) that correspond to the one or more SOR updates that are referenced by the one or more objects that are authorized to indicate the one or more SOR updates in the user interface of the application. The computing system may comprise a second cache tier configured to store one or more unreferenced blocks of the blockchain. The one or more unreferenced blocks stored in the second cache tier may comprise one or more NFTs that are unreferenced by the one or more objects and are not authorized to indicate the one or more SOR updates.

The computing system may comprise one or more processors and memory storing computer-readable instructions that, when executed by the one or more processors, cause the computing system to generate the one or more unreferenced blocks of the blockchain. The one or more unreferenced blocks may correspond to the one or more SOR updates and may not be authorized to indicate the one or more SOR updates. The computing system may store the one or more unreferenced blocks of the blockchain in a second cache tier. The computing system may receive a request to update an unreferenced object of the one or more unreferenced objects. The computing system may determine whether the unreferenced object meets the one or more criteria. Based on the unreferenced object meeting the one or more criteria, the computing system may generate, a referenced block comprising an NFT that corresponds to the SOR update corresponding to the unreferenced object. The computing system may store the referenced block of the blockchain in the first cache tier. Further, the computing system may update the user interface to indicate the one or more SOR updates corresponding to the unreferenced object.

In one or more implementations, the memory may store additional computer-readable instructions that, when executed by the one or more processors, further cause the computing system to, based on the request to update the unreferenced object not meeting the one or more criteria, generate, in the user interface of the application, an indication that the unreferenced object is not authorized to be updated.

In one or more implementations, the memory may store additional computer-readable instructions to update the user interface that, when executed by the one or more processors, further cause the computing system to retrieve, from the SOR, the one or more SOR updates corresponding to the unreferenced object. Further, the computing system may generate, in the blockchain in the second cache tier, an unreferenced block indicating that NFT that was unreferenced is no longer unreferenced In one or more implementations, the NFT based on the unreferenced object may comprise (TTL) that indicates a time after which the unreferenced object is no longer capable of being updated.

In one or more implementations, the one or more NFTs may comprise one or more smart contracts comprising one or more instructions to automatically update the unreferenced object if the unreferenced object is determined to meet the one or more criteria.

In one or more implementations, the unreferenced object may correspond to a user interface element that is configured to display a system of record update corresponding to the unreferenced object. Further, the request to update the unreferenced object may be based on a user interaction with the user interface element.

In one or more implementations, the application may comprise a web application.

In one or more implementations, the update to the user interface may comprise modifying the unreferenced object to indicate the one or more SOR updates corresponding to the unreferenced object.

In one or more implementations, the one or more SOR updates may comprise a current account balance, an indication of whether a loan has been approved, an indication of an amount of a loan that has been approved, or an indication of whether a request to increase a credit limit has been approved.

In one or more implementations, the one or more criteria may comprise one or more authorized entity criteria. Meeting the one or more authorized entity criteria may comprise determining that an entity associated with the request is authorized to view the one or more SOR updates corresponding to the unreferenced object.

In one or more implementations, the one or more criteria may comprise one or more documentation criteria. Meeting the one or more documentation criteria may comprise determining that documentation required to complete a transaction has been submitted.

In one or more implementations, the one or more criteria may comprise one or more transaction criteria. Meeting the one or more transaction criteria may comprise determining that a transaction that is required to be completed for the unreferenced object to be updated has been completed.

In one or more implementations, the first cache tier and the second cache tier may be configured to perform operations more rapidly than the system of record. The operations may comprise reading data received by the first cache tier or the second cache tier, writing data to the first cache tier or the second cache tier, and/or accessing data stored in the first cache tier or the second cache tier.

Corresponding methods (e.g., computer-implemented methods), apparatuses, devices, systems, and/or computer-readable media (e.g., non-transitory computer readable media) are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Aspects of the disclosed technology may relate to devices, systems, non-transitory computer readable media, and/or methods for real-time cache updates. The disclosed technology may leverage the use of a distributed ledger and multiple cache tiers to perform updates of data (e.g., data objects) associated with updating an interface (e.g., a user interface). The use of these techniques may result in a variety of benefits and advantages including an improvement in update performance and/or more effective storage utilization.

The frequency with which data is updated may be based on the type of data. Data that is updated frequently may be stored in cache memory that is high speed (e.g., memory that is able to read, write, and/or transfer data more rapidly than non-cache memory), thereby allowing interfaces associated with the data to be more rapidly updated. Further, the state of a user interface for an application may be updated based on requests to change object data that is in turn reflected in the user interface.

For example, a user interface of a financial institution (FI) application may comprise a user interface element that indicates the current balance of a user's account. The current balance of the user's account may be stored in a data object that has a value that may change based on transactions that change the balance of the user's account. When the data object indicating the balance of the user's account changes, the change may be reflected in the interface element corresponding to the data object. However, some changes in the data object may require validation before being reflected in the interface. For example, certain transfers of funds may need to be authorized or held for a predetermined amount of time before being reflected in the associated interface. The disclosed technology may use memory comprising cache tiers that may store a blockchain with non-fungible tokens associated with smart contracts that may be used to more effectively validate updates to data (e.g., data objects) that are associated with an interface.

For example, a computing system (e.g., an update computing platform) may retrieve system of record updates from a system of record (e.g., a computing system that is an authoritative source of data). The system of record updates may correspond to one or more referenced objects that have been validated (e.g., the state of the referenced data has been authorized by an authorized entity). The computing system may then generate blocks in a blockchain stored in a distributed ledger system. The blocks may comprise one or more non-fungible tokens (NFTs) based on one or more referenced objects stored in a first cache tier of the distributed ledger's memory. Further, the one or more NFTs may be associated with one or more smart contracts that may be used to authenticate updates. For example, the smart contracts may be used to check if an update has been authorized to be reflected in the user interface corresponding to the data object associated with an NFT. The NFTs may have a time to live that may invalidate and/or remove an NFT at a predetermined time in the future. The blocks may then be added to the blockchain. Further, the blocks may be stored in a second cache tier that is used to store unreferenced objects that have not been validated. An application may send a request to update an unreferenced object that is associated with a user interface of the application. For example, a user may interact with a user interface element of a user interface in order to obtain an update of the value or state of some object (e.g., an object value indicating whether a loan has been approved and/or an amount of the loan that was approved).

The computing system may determine, based on using the blockchain to authenticate the NFT corresponding to the unreferenced object, whether the request to update the unreferenced object is valid (e.g., the unreferenced object may be determined to be valid if the unreferenced object meets one or more criteria). Based on the unreferenced object associated with the user interface being valid, the computing system may generate, in the first cache tier, a block comprising an NFT corresponding to the unreferenced object. Further, the computing system may generate a block indicating that the unreferenced object is no longer unreferenced. The block may be stored in a second cache tier. The computing system may then update the user interface of the application based on the unreferenced object. For example, if the unreferenced object is associated with updating the state of a loan request, the user interface may show the current status of the loan request (e.g., an indication that a loan for a specified amount of money was approved). Based on the request to update the unreferenced object not being valid, the unreferenced object may remain unreferenced and the user interface may not be updated.

Figure 1:
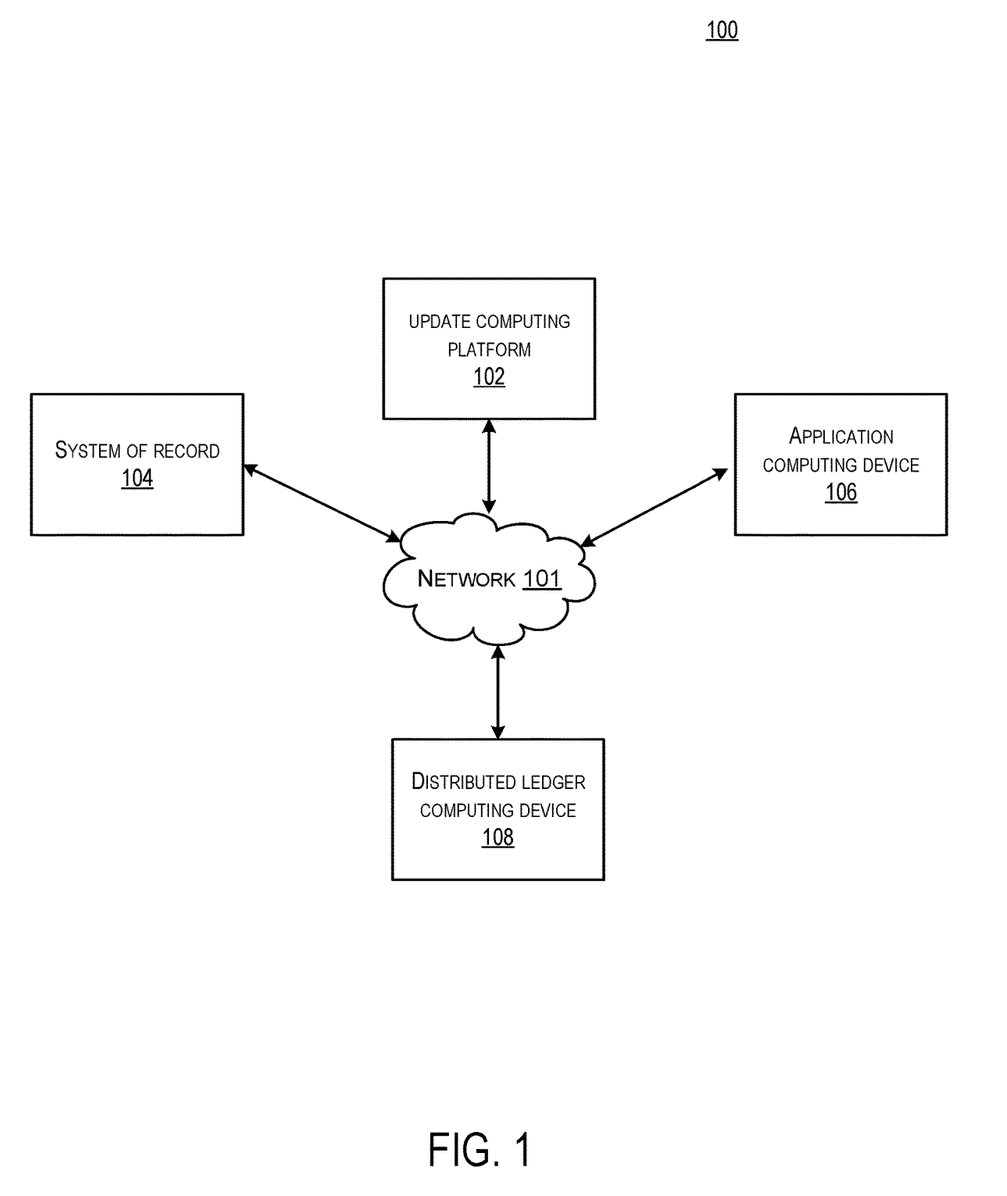
FIG. 1 depicts an illustrative computing environment for automatically updating caches in real-time in accordance with one or more aspects of the disclosure.

FIG. 1 depicts an illustrative computing environment for automatically updating caches in real-time in accordance with one or more aspects of the disclosure. Referring to FIG. 1, computing environment 100 may include one or more computing systems. For example, computing environment 100 may include update computing platform 102, system of record 104, application computing device 106, and/or distributed ledger computing device 108.

As described further below, update computing platform 102 may comprise a computing system that includes one or more computing devices (e.g., computing devices comprising one or more processors, one or more memory devices, one or more storage devices, and/or communication interfaces) that may be used to process requests to update an object (e.g., an unreferenced object) of a user interface, generate blocks of a blockchain, determine whether an unreferenced object meets one or more criteria, store a referenced block of the blockchain in a first cache tier, store an unreferenced block of the blockchain in a second cache tier, and/or update the user interface. For example, the update computing platform 102 may be configured to receive a request to update an object of a user interface from application computing device 106, retrieve one or more system of record updates from system of record 104, and/or cause blocks of a blockchain to be generated in cache tiers of the distributed ledger computing device 108.

In some implementations, the update computing platform 102 may access information (e.g., one or more system of record updates) that are stored on the system of record 104. The update computing platform 102 may send data system of record 104, application computing device 106 which, and/or distributed ledger computing device 108. For example, the update computing platform 102 may determine whether authorization to update a user interface implemented on application computing device 106 may be granted. Communication between the update computing platform 102, system of record 104, application computing device 106, and/or the distributed ledger computing device 108 may be encrypted. For example, the one or more system of record updates may be encrypted in order to secure confidential information that is included in the one or more system of record updates (e.g., confidential financial information such as an approved loan amount). In some embodiments, the update computing platform 102 may access one or more computing devices and/or computing systems remotely. For example, the update computing platform 102 may remotely access the system of record 104, the application computing device 106, and/or the distributed ledger computing device 108.

System of record 104 may comprise a computing device or computing system that is configured to operate one or more databases, store one or more system of record updates (e.g., store the one or more system of record updates in one or more databases), modify one or more system of record updates in one or more databases, generate one or more system of record updates in one or more databases, and/or delete one or more system of record updates in one or more databases. The system of record 104 may be an authoritative data source and data (e.g., the one or more system of record updates) stored in the system of record 104 may supersede one or more system of record updates stored in other devices. For example, the system of record 104 may store a most up-to-date copy of one or more system of record updates.

The system of record 104 may be located at a different physical location than the update computing platform 102 and/or the application computing device 106. Although a single instance of the system of record 104 is shown, this is for illustrative purposes only, and any number of computing systems may comprise a single system of record 104 and may be included in the computing environment 100 without departing from the scope of the disclosure. Each of the one or more computing devices and/or one or more computing systems described herein may comprise one or more processors, one or more memory devices, one or more storage devices (e.g., one or more solid state drives (SSDs), one or more hard disk drives (HDDs), and/or one or more hybrid drives that incorporate SSDs, HDDs, and/or RAM), and/or a communication interface that may be used to send and/or receive data and/or perform operations.

Application computing device 106 may comprise one or more computing devices and/or one or more computing systems. Each of the one or more computing devices and/or one or more computing systems may comprise one or more processors, one or more memory devices, one or more storage devices, and/or a communication interface that may be used to send and/or receive data and/or perform operations including updating an object of a user interface. For example, the application computing device 106 may send, to the update computing platform 102, a request to update an unreferenced object of a user interface that is implemented on the application computing device 106. For example, the application computing device 106 may comprise a smartphone that executes a FI application that comprises a user interface with a plurality of interface elements that correspond to objects that indicate information corresponding to one or more system of record updates stored in system of record 104.

Distributed ledger computing device 108 may comprise a computing device or computing system that includes one or more computing devices (e.g., servers, server blades, or the like) and/or other computer components (e.g., processors, memories, communication interfaces) that may be used to generate, host, and/or otherwise maintain a distributed ledger (e.g., a blockchain, holochain, and/or other distributed ledgers). For example, the distributed ledger computing device 108 may comprise a blockchain that stores one or more blocks. The one or more blocks stored in the blockchain may comprise one or more unreferenced blocks (e.g., one or more blocks comprising NFTs that are referenced by one or more objects of a user interface that meet one or more criteria) and/or one or more referenced blocks (e.g., one or more unreferenced blocks that are referenced by one or more objects of a user interface that do not meet the one or more criteria).

Further, the distributed ledger computing device 108 may comprise one or more cache tiers (e.g., a first cache tier and/or a second cache tier). The one or more cache tiers may be implemented on a high speed storage device (e.g., a RAM drive and/or a SSD) and may comprise data (e.g., one or more system of record updates) that is stored in the system of record 104. Further, the performance (e.g., throughput, latency, data reading performance, data writing performance, and/or data accessing performance) of one or more storage devices on which the one or more cache tiers are implemented may be greater than the performance of one or more storage devices on which the system of record 104 is implemented. The one or more cache tiers may comprise cache tier store update data (e.g., blocks of a blockchain that are used to update one or more system of record updates). The distributed ledger computing device 108 may communicate with the update computing platform 102 to authenticate credentials of a device and/or user that is requesting access to the distributed ledger computing device 108.

Computing environment 100 may include one or more networks, which may interconnect the update computing platform 102, system of record 104, application computing device 106, and/or distributed ledger computing device 108. For example, computing environment 100 may include a network 101 which may interconnect, update computing platform 102, system of record 104, application computing device 106, and/or distributed ledger computing device 108. In some instances, the network 101 may comprise a 4G data network, a 5G data network, and/or other type of data network.

In one or more arrangements, update computing platform 102, system of record 104, application computing device 106, and/or distributed ledger computing device 108 may comprise one or more computing devices capable of sending and/or receiving data and processing the data accordingly. For example, update computing platform 102, system of record 104, application computing device 106, distributed ledger computing device 108, and/or the other systems included in computing environment 100 may, in some instances, include server computers, desktop computers, laptop computers, tablet computers, smartphones, or the like that may include one or more processors, one or more memory devices, communication interfaces, one or more storage devices, and/or other components. Further, any combination of update computing platform 102, system of record 104, application computing device 106, and/or distributed ledger computing device 108 may, in some instances, comprise special-purpose computing devices configured to perform specific functions. For example, update computing platform 102 may comprise one or more application specific integrated circuits (ASICs) that are configured to process requests to update an object (e.g., an unreferenced object) of a user interface, generate blocks of a blockchain, determine whether an unreferenced object meets one or more criteria, and/or update the user interface.

Figure 2:
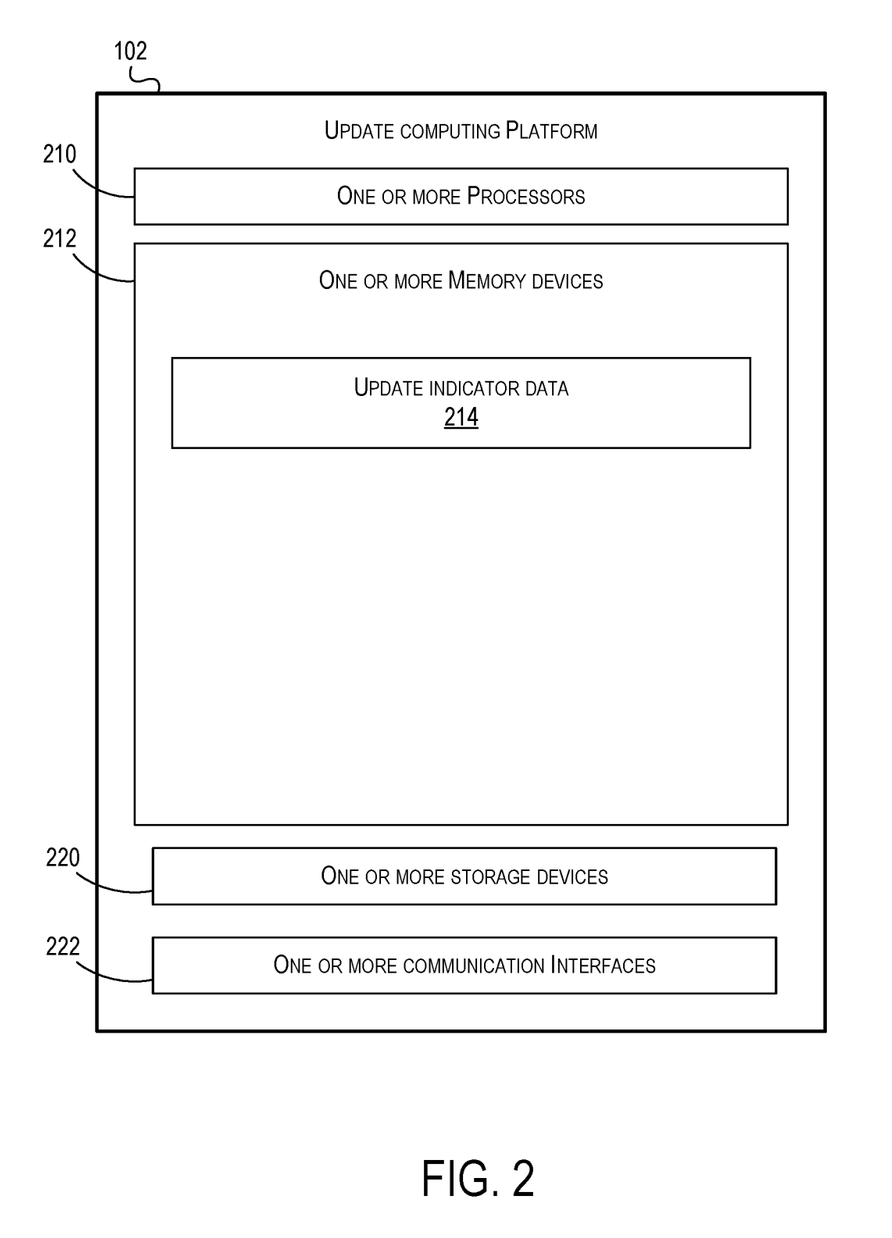
FIG. 2 depicts an illustrative computing system for automatically updating caches in real-time in accordance with one or more aspects of the disclosure.

FIG. 2 depicts an illustrative computing system for automatically updating caches in real-time in accordance with one or more aspects of the disclosure. Update computing platform 102 may include one or more processors (e.g., processor 210), one or more memory devices 212, and a communication interface (e.g., one or more communication interfaces 222). A data bus may interconnect the processor 210, one or more memory devices 212, one or more storage devices 220, and/or one or more communication interfaces 222. The one or more communication interfaces 222 may be configured to support communication between update computing platform 102 and one or more networks (e.g., network 101, or the like). the one or more communication interfaces 222 may be communicatively coupled to the one or more processor 210.

The memory may include one or more program modules having instructions that when executed by one or more processor 210 cause the update computing platform 102 to perform one or more functions described herein and/or access data that may store and/or otherwise maintain information which may be used by such program modules and/or one or more processors 210. One or more memory devices 212 may comprise RAM. In some instances, the one or more program modules and/or databases may be stored by and/or maintained in different memory units of update computing platform 102 and/or by different computing devices that may form and/or otherwise make up update computing platform 102. For example, the memory may have, host, store, and/or include one or more system of record updates 214. One or more storage devices 220 (e.g., solid state drives and/or hard disk drives) may also be used to store data including the one or more system of record updates. The one or more storage devices 220 may comprise non-transitory computer readable media that may store data when the one or more storage devices 220 are in an active state (e.g., powered on) or an inactive state (e.g., sleeping or powered off).

One or more system of record updates 214 may comprise one or more system of record updates that indicate updates to one or more objects of a user interface of an application. The one or more system of record updates may be used as the basis for indications that are reflected (e.g., rendered and/or displayed) in the user interface of an application. For example, the one or more system of record updates 214 may correspond to an object comprising an indication of a current balance of an account (e.g., checking account, savings account, or other accounts) that is displayed in the user interface of a FI application.

Figure 3:
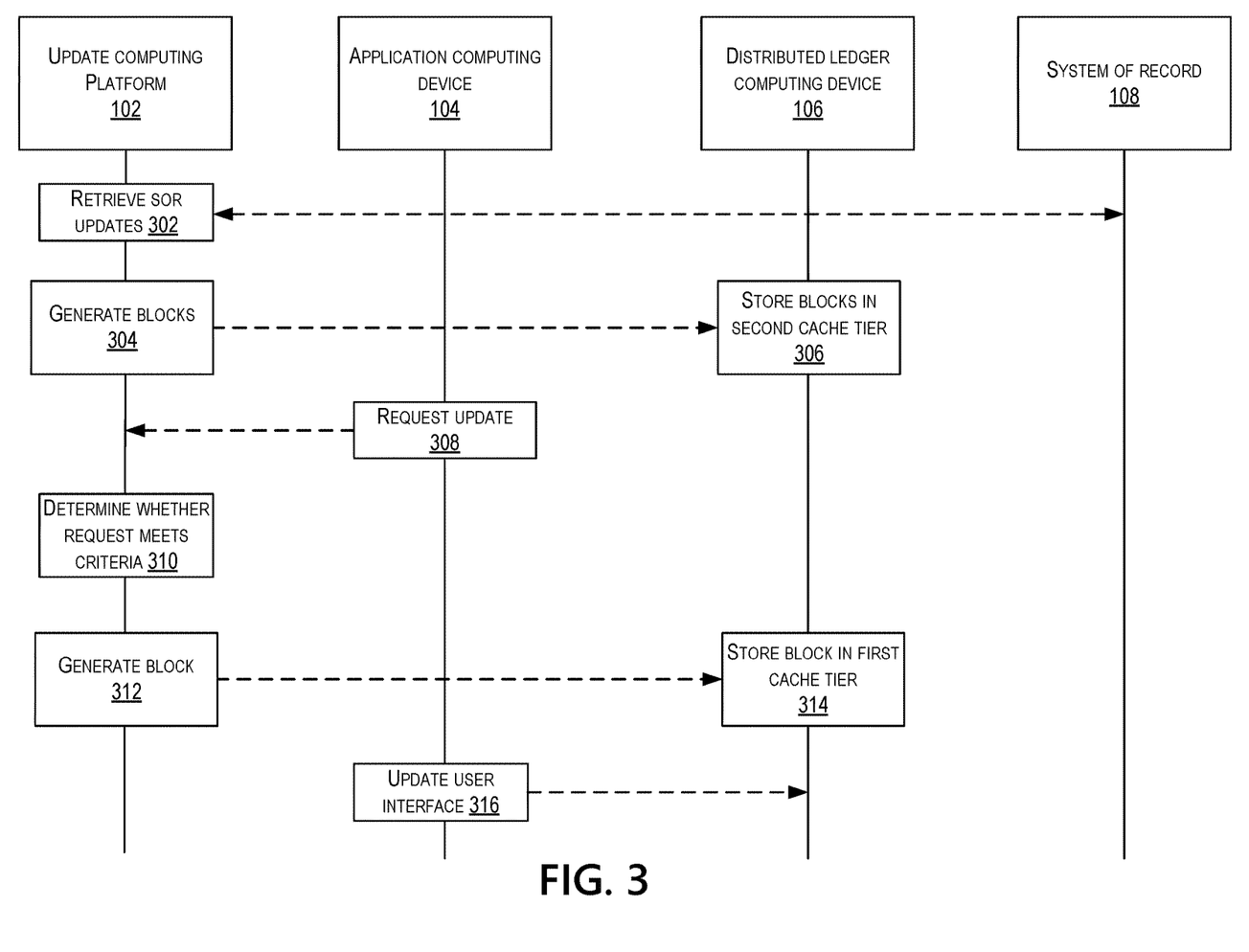
FIG. 3 depicts an illustrative event sequence for automatically updating caches in real-time in accordance with one or more aspects of the disclosure.

FIG. 3 depicts an illustrative event sequence for automatically updating caches in real-time in accordance with one or more aspects of the disclosure. The steps of the event sequence may be performed by update computing platform 102, system of record 104, application computing device 106, and/or distributed ledger computing device 108, which are described with respect to FIG. 1.

Referring to FIG. 3, at step 302, the update computing platform 102 may retrieve one or more system of record updates from system of record 104. The one or more system of record updates that may be referenced by one or more objects that are authorized to indicate the one or more system of record updates in a user interface of an application.

In some embodiments, update computing platform 102 may periodically establish a data connection with the system of record 104 in order to receive up-to-date copies of one or more system of record updates that are authorized to be updated. The system of record updates may correspond to one or more objects of a user interface that do have default authorization or are not required to be authorized. For example, a user's name that is indicated in a user interface may be updated based on default authorization provided by the user. In some instances, the update computing platform 102 may determine whether the update computing platform 102 has an updated copy of one or more objects of a user interface and may send a request to the update computing platform 102 if the unreferenced object does not require authorization to be updated.

At step 304, the update computing platform 102 may generate one or more unreferenced blocks that may be added to a blockchain stored in distributed ledger computing device 108. The one or more unreferenced blocks may be based on the one or more system of record updates. The one or more unreferenced blocks may comprise one or more NFTs that may be referenced by one or more referenced objects (e.g., objects that meet one or more criteria). In some embodiments, the blockchain may be encrypted and keys to decrypt blocks of the blockchain may be distributed to authorized entities.

At step 306, the unreferenced block generated in step 304 may be stored in a second cache tier of the distributed ledger computing device 108. The second cache tier may comprise one or more storage devices that may be higher performance (e.g., greater throughput and lower latency) than the one or more storage devices used to store the one or more system of record updates in the system of record 104.

At step 308, an update computing platform 102 may receive, from application computing device 106 (e.g., a smartphone) a request to update an unreferenced object of a user interface. The unreferenced object may correspond to one or more system of record updates. The one or more system of record updates may correspond to one or more objects that are used to indicate one or more updates to a user interface. For example, the unreferenced object may correspond to an interface element of the user interface and may be used to indicate whether a request to reduce an interest rate for a line of credit has been approved. Approval of the request to reduce the interest rate may be pending and may not be indicated in the user interface until the request has been approved by an authorized entity at the financial institution.

At step 310, the update computing platform 102 may determine whether the unreferenced object meets one or more criteria. For example, the update computing platform 102 may analyze the unreferenced object and determine whether there are criteria that must be met before the unreferenced object is updated. For example, if the unreferenced object corresponds to an indicator of a loan approval, the one or more criteria may comprise the loan being approved and the indicator may not be updated before the loan is approved.

At 312, based on the unreferenced object meeting the one or more criteria, a referenced block may be generated. The referenced block may an NFT that is referenced by the unreferenced object and indicates that the unreferenced object is authorized to indicate the one or more SOR updates in the user interface of the application.

At step 314, the referenced block may be stored in a first cache tier of the distributed ledger computing device 108. The referenced block may be referenced by the unreferenced object and used to update a corresponding user interface that may be generated on the application computing device 106.

At step 316, the application computing device 106 may update a user interface that is generated by the application computing device 106. The update to the user interface may comprise updating the unreferenced object so that it indicates the system of record updates. For example, the unreferenced object may correspond to a loan approval status indicator and the updated loan approval status indicator may indicate that a loan that was requested has been granted.

Figure 4:
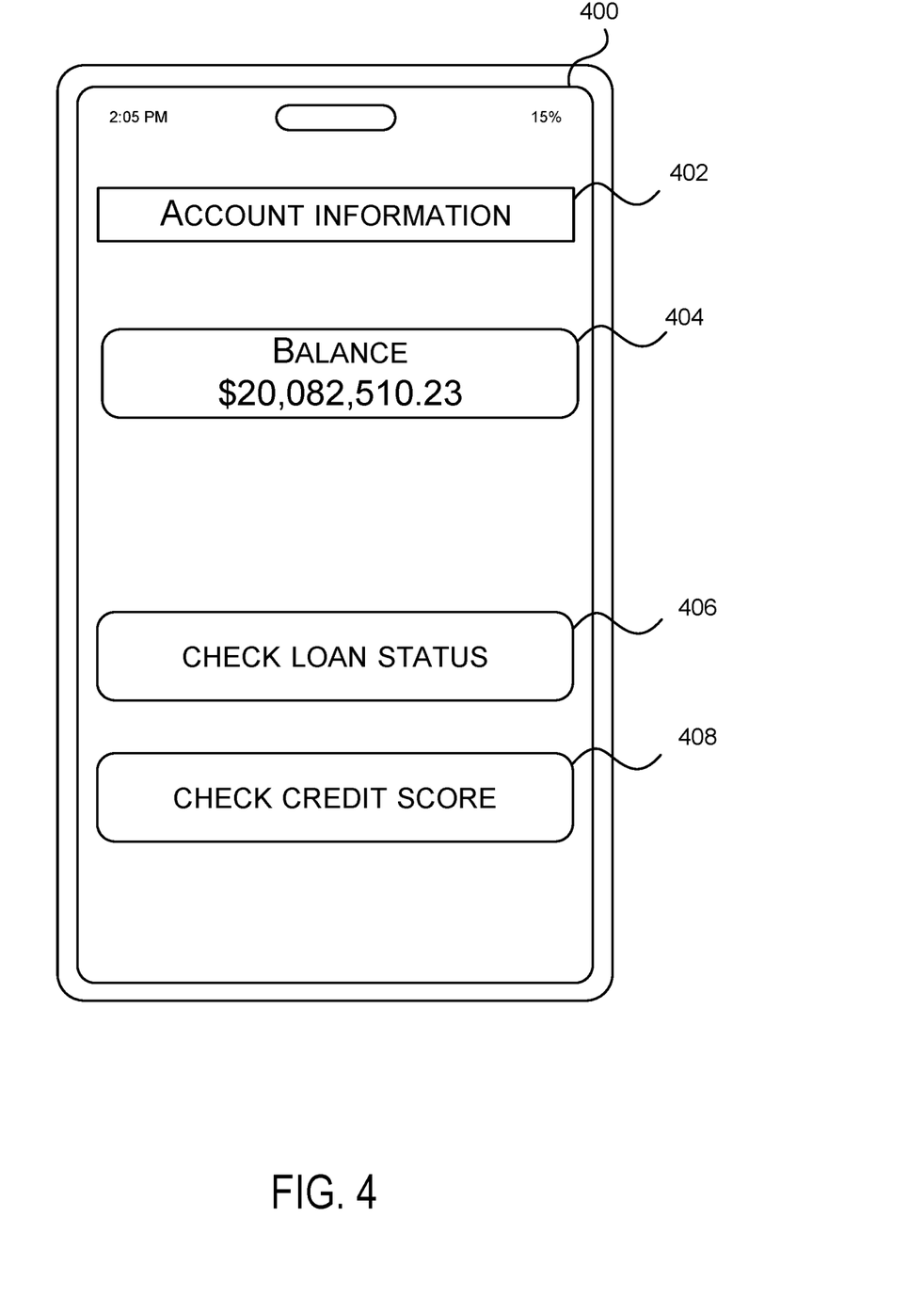
FIG. 4 depicts an illustrative user interface that may be updated to indicate system of record updates.

FIG. 4 depicts an illustrative user interface that may be updated using cached system of record updates. The user interface 400 may be implemented on the computing devices and/or computing systems described herein including the application computing device 106 described with respect to FIG. 1. Referring to FIG. 4, user interface 400 (e.g., a user interface implemented on a display device of a smartphone) may comprise indicators for a FI application. In this example, the indicators may correspond to referenced objects that may reference and/or be referenced by one or more system of record updates. The indicators may comprise account information indicator 402, account balance indicator 404, loan status indicator 406, and credit score indicator 408. Further, the indicators 402-408 may be configured to display information which may comprise information corresponding to the one or more system of record updates.

Indicators of the user interface may comprise indicators that correspond to an object that does not require authorization to be updated and does not require a user input or interaction in order for the indicator to be updated (e.g., a current date and/or a title at the top of a user interface). For example, the account information indicator 402 indicates "ACCOUNT INFORMATION" which may inform a user of a type of information that is indicated in the user interface.

Further, indicators of the user interface may comprise indicators that correspond to an object that requires authorization to be updated and does not require a user input or interaction to be updated (e.g., an account balance update). For example, the account balance indicator 404 indicates "BALANCE $20,082,510.23" which informs a user of a current balance of the user's account at a FI. A system of record may store account balance information for a user and provide the information to an object of the user interface without a user having to interact with the user interface or the account balance indicator 404 that indicates the account balance.

Indicators of the user interface may comprise indicators that correspond to an object that does not require authorization to be updated and does require a user input and/or interaction for the indicator to be updated (e.g., the status of a requested loan). For example, the loan status indicator 406 indicates "CHECK LOAN STATUS" which a user may interact with (e.g., touching the loan status indicator 406) in order to determine the status of a loan the user requested. The object that requests the current loan status may be updated if the loan status has been approved. If the loan status has not been approved, the loan status indicator 406 may indicate that the loan status is pending (e.g., the loan status indicator may indicate "APPROVAL OF LOAN PENDING").

Further, indicators of the user interface may comprise indicators that correspond to an object that does not require authorization to be updated and does require a user input and/or interaction for the indicator to be updated (e.g., a credit score update). For example, the credit score indicator 408 indicates "CHECK CREDIT SCORE" which a user may interact with (e.g., touching the credit score indicator 408) in order to determine the user's credit score.

Figure 5:
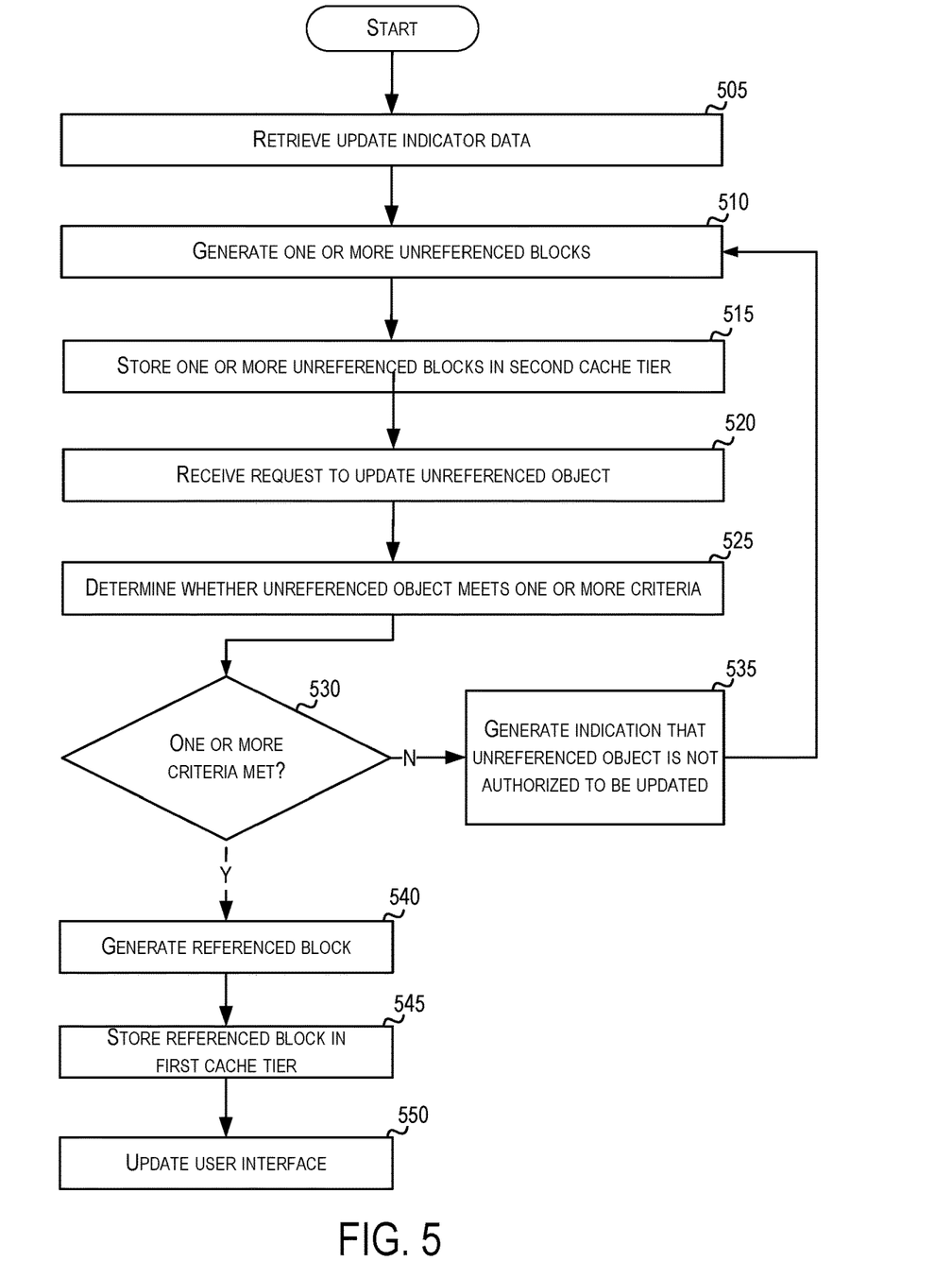
FIG. 5 depicts an illustrative method for automatically updating a cache in real-time in accordance with one or more aspects of the disclosure.

FIG. 5 depicts an illustrative method for automatically updating a cache in real-time in accordance with one or more aspects of the disclosure. The steps of a method 500 for automatically generating updating a cache in real-time may be implemented by a computing device or computing system (e.g., the update computing platform 102) in accordance with the computing devices and/or computing systems described herein. One or more of the steps described with respect to FIG. 5 may be omitted, performed in a different order, and/or modified. Further, one or more other steps (e.g., the steps described with respect to FIG. 6) may be added to the steps described with respect to FIG. 5.

At step 505, a computing system may retrieve one or more system of record (SOR) updates. For example, the update computing platform 102 may retrieve the one or more system of record updates from system of record 104. The one or more system of record updates may comprise information that may be indicated in a user interface (e.g., a user interface of an application). The application may comprise a web application (e.g., an application implemented on a web page in a browser) and/or a mobile application (e.g., an application implemented on a smartphone or tablet). For example, the one or more system of record updates may provide account information that may be indicated in a user interface of a FI application.

The one or more SOR updates may comprise a current account balance, an indication of whether a loan has been approved, an indication of an amount of a loan that has been approved, and/or an indication of whether a request to increase a credit limit has been approved.

At step 510, a computing system may generate one or more unreferenced blocks of a blockchain. The one or more unreferenced blocks may correspond to one or more system of record (SOR) updates. Further, the one or more unreferenced blocks may comprise one or more NFTs that are unreferenced by one or more objects that meet one or more criteria. The one or more unreferenced blocks may not be authorized to indicate the one or more SOR updates in a user interface of an application. For example, the update computing platform 102 may generate the one or more unreferenced blocks that may be added to a blockchain stored in a second cache tier of distributed ledger computing device 108.

The one or more SOR updates may comprise a current account balance, an indication of whether a loan has been approved, an indication of an amount of a loan that has been approved, and/or an indication of whether a request to increase a credit limit has been approved.

The NFT based on the unreferenced object may comprise a time to live (TTL) that indicates a time after which the unreferenced object is no longer capable of being updated. For example, an unreferenced object may comprise a time to live of one week, after which the time to live will no longer be updated. By way of further example, the unreferenced object may correspond to a system of record update for a timely payment reminder for a particular day (e.g., the day before the payment is due). The unreferenced object may comprise a TTL that expires on the day immediately following the day the payment is due (e.g., the TTL may expire at 12:00 AM of the next day after the day the payment is due).

At step 515, a computing system may store the one or more unreferenced blocks in a second tier cache. The first cache tier and/or second tier cache may be configured to perform operations more rapidly than the system of record. For example, the first cache tier and/or the second cache tier may be implemented on a high performance storage device (e.g., a high performance SSD) and the system of record may be implemented on a lower performance storage device (e.g., an HDD or a lower performance SSD).

The operations may comprise reading data received by the second cache tier, writing data to the second cache tier, and/or or accessing data stored in the second cache tier. For example, the second tier cache may have throughput (e.g., 6,000 megabytes per second) that is fifty times greater than the throughput of the system of record (e.g., 120 megabytes per second). By way of further example, the input/output operations per second (IOPS) for a first cache tier and/or a second cache tier (e.g., 1,000,000 IOPS) may be ten thousand times greater than the IOPS for the system of record (e.g., 100 IOPS). Further, latency of the first cache tier and/or the second cache tier may be lower than the latency of the system of record. For example, the latency of the first cache tier and/or the second cache tier (e.g., a latency of 0.2 milliseconds) may be one tenth the latency of a system of record (e.g., a latency of 2 milliseconds).

At step 520, a computing system may receive a request to update an unreferenced object of a user interface of an application. The unreferenced object may correspond to an unreferenced block of the one or more unreferenced blocks. For example, a user interface of the application computing device 106 may comprise a plurality of interface elements that indicate information corresponding to one or more objects that correspond to one or more system of record updates stored in system of record 104. The application computing device 106 may request that an unreferenced object of the one or more objects of the user interface be updated to indicate the state of the corresponding system of record indication.

The unreferenced object may correspond to a user interface element of the user interface. For example, as described with respect to FIG. 4, a user interface may comprise a user interface element that may correspond to an object that may be used to retrieve a system of record update that is indicated within the user interface. The interface element may be configured to display a system of record update corresponding to the unreferenced object. Further, the request to update the unreferenced object may be based on a user interaction with the user interface element. For example, a user may touch a user interface element corresponding to the unreferenced object. The user interface element may be generated on a screen that displays the user interface.

At step 525, the computing system may determine whether the request to update the unreferenced object meets one or more criteria. For example, the update computing platform 102 may analyze the unreferenced object in order to determine whether the unreferenced object meets the one or more criteria. For example, the unreferenced object may correspond to a system of record update that indicates whether a mortgage has been approved. The unreferenced object may indicate that the mortgage approval is pending and updating the unreferenced object may provide an indication, in a user interface, of the current status of the corresponding system of record update.

The one or more criteria may comprise one or more authorized entity criteria. Meeting the one or more authorized entity criteria may comprise determining that an entity associated with the request is authorized to view the one or more SOR updates corresponding to the unreferenced object. For example, the update computing platform 102 may determine that the unreferenced object may meet the one or more criteria and be updated because the entity associated with the unreferenced object is an account manager of a mortgage account that is authorized to view the one or more SOR updates that indicate whether a mortgage has been approved.

The one or more criteria may comprise one or more documentation criteria. Meeting one or more authorized entity criteria may comprise determining that documentation required to complete a transaction has been submitted. For example, the update computing platform 102 may determine that the unreferenced object may meet the one or more criteria and be updated because the documentation associated with the unreferenced object is a mortgage application form that has been completed and signed by a user and that the unreferenced object may be updated to indicate that the mortgage application form has been completed and signed and that the mortgage approval is pending and may be provided in one week.

The one or more criteria may comprise one or more transaction criteria. Meeting the one or more transaction criteria may comprise determining that a transaction that is required to be completed for the unreferenced object to be updated has been completed. For example, the update computing platform 102 may determine that the unreferenced object may meet the one or more criteria and be updated because a transaction comprising a bill payment has been completed and that the unreferenced object that indicates that a bill payment has been completed may be updated.

At step 530, the computing system may, based on the unreferenced object meeting the one or more criteria, perform step 540. For example, a computing system (e.g., the update computing platform 102) may determine that the unreferenced object meets the one or more criteria based on the entity associate with the unreferenced object being authorized to view SOR updates.

Based on a request not meeting the one or more criteria, the computing system may perform step 535. For example, a computing system (e.g., the update computing platform 102) may determine that the request meets the one or more criteria based on the unreferenced object is not authorized to update the user interface.

At step 535, a computing system may generate an indication that the unreferenced object is not authorized to be updated. For example, a user of an application computing device 106 (e.g., a smartphone) may have accessed a FI application that is executing on the application computing device 106. The FI application may comprise an interactive interface element that corresponds to the unreferenced object. The unreferenced object may correspond to a request for a loan. As a result of the loan amount not being approved, the update computing platform 102 may generate a message indicating "THE LOAN IS PENDING" that may be displayed on a display device of the update computing platform 102. The computing system may perform step 505 after completing step 535.

At step 540, a computing system may generate a block (e.g., a referenced block) of a blockchain. The block may comprise an NFT that corresponds to the SOR update corresponding to the unreferenced object. For example, the update computing platform 102 may generate a referenced block that comprises an NFT. The NFT may comprise a smart contract that may comprise instructions to update a user interface if the unreferenced object meets one or more criteria.

The one or more NFTs may comprise one or more smart contracts comprising one or more instructions to automatically update the unreferenced object if the unreferenced object is determined to meet the one or more criteria. For example, a smart contract of the one or more NFTs may be used to authorize an automatic update of an object of a user interface that is used to display the status of a loan application, and the loan application has been granted and authorization to indicate that the loan application was granted has been authorized. For example, based on the update computing platform 102 determining that the loan application was granted, the smart contract may cause the update computing platform to update the user interface and indicate that the loan was granted. Based on the update computing platform 102 determining that the loan application was not granted, the smart contract may cause the update computing platform to generate an indication that the loan application is still pending.

At step 545, the referenced block may be stored in a first cache tier. For example, the update computing platform 102 may store the referenced block in the first cache tier. Storing the referenced block may comprise adding the referenced block to the blockchain stored in distributed ledger computing device 108. The first cache tier may comprise the features and/or capabilities of the second cache tier and may store and/or retrieve data more rapidly than the system of record.

At step 550, a computing system may update a user interface to indicate the one or more SOR updates corresponding to the unreferenced object. For example, the referenced block stored in the first cache tier may be accessed by the unreferenced object and used to update the user interface to indicate the one or more SOR updates corresponding to the unreferenced object. The computing system may perform step 505 after completing step 550.

Figure 6:
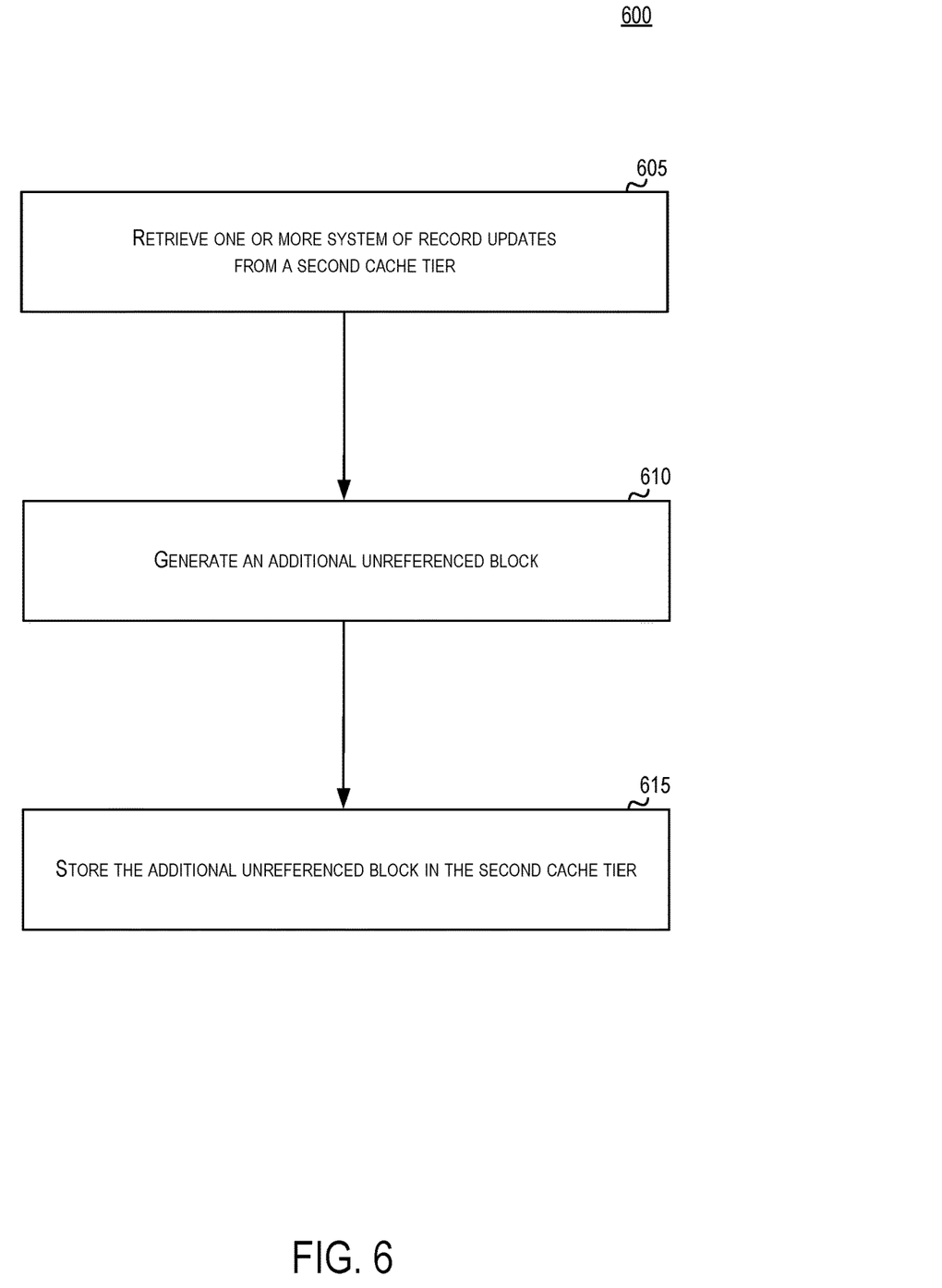
FIG. 6 depicts an illustrative method for automatically updating a user interface of an application in accordance with one or more aspects of the disclosure.

FIG. 6 depicts an illustrative method for automatically updating a cache in real-time in accordance with one or more aspects of the disclosure. The steps of a method 600 for automatically generating updating a cache in real-time may be implemented by a computing device or computing system (e.g., the update computing platform 102) in accordance with the computing devices and/or computing systems described herein. One or more of the steps described with respect to FIG. 6 may be omitted, performed in a different order, and/or modified. Further, one or more other steps (e.g., the steps described with respect to FIG. 5) may be added to the steps described with respect to FIG. 6.

At step 605, a computing system may retrieve one or more SOR updates corresponding to an unreferenced object. The one or more SOR updates may be retrieved from a second cache tier. For example, the application computing device 106 may retrieve, from a second cache tier stored in distributed ledger computing device 108, one or more SOR updates corresponding to a mortgage application object.

At step 610, a computing system may generate an additional unreferenced block of the blockchain. The additional unreferenced block may indicate that the NFT corresponding to the unreferenced object is no longer unreferenced. For example, the update computing platform 102 may generate an unreferenced block that corresponds to an unreferenced object that indicates whether a mortgage request may be updated.

At step 615, a computing system may store the additional unreferenced block in the second cache tier. For example, the update computing platform 102 may send the additional unreferenced block to the distributed ledger computing device 108, which may store the additional unreferenced block in a block chain of the second cache tier.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing system for real-time cache updating, the computing system comprising:
    a system of record (SOR) database device configured to store one or more SOR updates;
    a distributed ledger system comprising:
        a first cache tier configured to store one or more referenced blocks of a blockchain, wherein the one or more referenced blocks stored in the first cache tier comprise one or more non-fungible tokens (NFTs) that correspond to the one or more SOR updates, and wherein the one or more NFTs are referenced by one or more objects that are authorized to indicate the one or more SOR updates in a user interface of an application;
        a second cache tier configured to store one or more unreferenced blocks of the blockchain, wherein the one or more unreferenced blocks stored in the second cache tier comprise one or more NFTs that are unreferenced by the one or more objects and are not authorized to indicate the one or more SOR updates;
    one or more processors; and
    memory storing computer-readable instructions that, when executed by the one or more processors, cause the computing system to:
        generate the one or more unreferenced blocks of the blockchain, wherein the one or more unreferenced blocks correspond to the one or more SOR updates and are not authorized to indicate the one or more SOR updates;
        storing the one or more unreferenced blocks of the blockchain in a second cache tier;
        receive a request to update an unreferenced object corresponding to an unreferenced block of the one or more unreferenced blocks;
        determine whether the unreferenced object meets one or more criteria;
        based on the unreferenced object meeting the one or more criteria, generate, a referenced block of the blockchain, wherein the referenced block comprises an NFT that corresponds to the SOR update corresponding to the unreferenced object;
        store the referenced block in the first cache tier; and
        update the user interface to indicate the one or more SOR updates corresponding to the unreferenced object.

2. The computing system of claim 1, wherein the memory stores computer-readable instructions that, when executed by the one or more processors, cause the computing system to:
    based on the request to update the unreferenced object not meeting the one or more criteria, generate, in the user interface, an indication that the unreferenced object is not authorized to be updated.

3. The computing system of claim 1, wherein the memory stores computer-readable instructions to update the user interface that, when executed by the one or more processors, cause the computing system to:
    retrieve, from the second cache tier, the one or more SOR updates corresponding to the unreferenced object;
    generate an additional unreferenced block of the blockchain, wherein the additional unreferenced block indicates that the NFT corresponding to the unreferenced object is no longer unreferenced; and
    store the unreferenced block in the second cache tier.

4. The computing system of claim 1, wherein the NFT based on the unreferenced object comprises a time to live (TTL) that indicates a time after which the unreferenced object is no longer capable of being updated.

5. The computing system of claim 1, wherein the one or more NFTs comprise one or more smart contracts comprising one or more instructions to automatically update the unreferenced object if the unreferenced object is determined to meet the one or more criteria.

6. The computing system of claim 1, wherein the unreferenced object may correspond to a user interface element of the user interface, and wherein the interface element is configured to display the SOR update corresponding to the unreferenced object.

7. The computing system of claim 1, wherein the request to update the unreferenced object is based on a user interaction with a user interface element of a user interface.

8. The computing system of claim 1, wherein the application comprises a web application.

9. The computing system of claim 1, wherein the one or more SOR updates comprise a current account balance, an indication of whether a loan has been approved, an indication of an amount of a loan that has been approved, or an indication of whether a request to increase a credit limit has been approved.

10. The computing system of claim 1, wherein the one or more criteria comprise one or more authorized entity criteria, and wherein the meeting one or more authorized entity criteria comprises determining that an entity associated with the request is authorized to view the one or more SOR updates corresponding to the unreferenced object.

11. The computing system of claim 1, wherein the one or more criteria comprise one or more documentation criteria, and wherein the meeting the one or more documentation criteria comprises determining that documentation required to complete a transaction has been submitted.

12. The computing system of claim 1, wherein the one or more criteria comprise one or more transaction criteria, and wherein the meeting the one or more transaction criteria comprises determining that a transaction that is required to be completed for the unreferenced object to be updated has been completed.

13. The computing system of claim 1, wherein the first cache tier and the second cache tier are configured to perform operations more rapidly than the system of record, and wherein the operations comprise reading data received by the first cache tier or the second cache tier, writing data to the first cache tier or the second cache tier, or accessing data stored in the first cache tier or the second cache tier.

14. A method of real-time cache updating, the method comprising:
retrieving, by a computing device comprising one or more processors, one or more system of record (SOR) updates;
generating, by the computing device, one or more unreferenced blocks of a blockchain corresponding to the one or more SOR updates, wherein the one or more unreferenced blocks comprise one or more NFTs that are unreferenced by one or more objects that meet one or more criteria, and wherein the one or more unreferenced blocks are not authorized to indicate the one or more SOR updates in a user interface of an application;
storing, by the computing device, the one or more unreferenced blocks in a second cache tier;
receiving, by the computing device, a request to update an unreferenced object corresponding to an unreferenced block of the one or more unreferenced blocks;
determining, by the computing device, whether the unreferenced object meets the one or more criteria;
based on the request to update the unreferenced object meeting the one or more criteria, generating, by the computing device, a referenced block of the blockchain, wherein the referenced block comprises an NFT that corresponds to the SOR update corresponding to the unreferenced object;
storing, by the computing device, the referenced block in a first cache tier; and
updating, by the computing device, the user interface to indicate the one or more SOR updates corresponding to the unreferenced object.

15. The method of claim 14, further comprising:
based on the request to update the unreferenced object not meeting the one or more criteria, generating, by the computing device, in the user interface, an indication that the unreferenced object is not authorized to be updated.

16. The method of claim 14, wherein the updating the user interface comprises:
retrieving, by the computing device, from the SOR, the one or more SOR updates corresponding to the unreferenced object; and
generating, by the computing device, in the second cache tier, a block indicating that the NFT that was unreferenced is no longer unreferenced.

17. The method of claim 14, wherein the one or more NFTs comprise one or more smart contracts comprising one or more instructions to automatically update the unreferenced object if the unreferenced object is determined to meet the one or more criteria.

18. The method of claim 14, wherein the one or more criteria comprise one or more authorized entity criteria, and wherein the meeting one or more authorized entity criteria comprises determining that an entity associated with the request is authorized to view the one or more SOR updates corresponding to the unreferenced object.

19. The method of claim 14, wherein the one or more criteria comprise one or more documentation criteria, and wherein the meeting the one or more documentation criteria comprises determining that documentation required to complete a transaction has been submitted.

20. One or more non-transitory computer-readable comprising instructions that, when executed by a computing platform comprising at least one processor and memory, cause the computing platform to:
retrieve one or more system of record (SOR) updates;
generate one or more unreferenced blocks of a blockchain corresponding to the one or more SOR updates, wherein the one or more unreferenced blocks comprise one or more NFTs that are unreferenced by one or more objects that meet one or more criteria, and wherein the one or more unreferenced blocks are not authorized to indicate the one or more SOR updates in a user interface of an application;
store the one or more unreferenced blocks in a second cache tier;
receive a request to update an unreferenced object corresponding to an unreferenced block of the one or more unreferenced blocks;
determine whether the unreferenced object meets the one or more criteria;
based on the request to update the unreferenced object meeting the one or more criteria, generate a referenced block of the blockchain, wherein the referenced block comprises an NFT that corresponds to the SOR update corresponding to the unreferenced object;
store the referenced block in a first cache tier; and
update the user interface to indicate the one or more SOR updates corresponding to the unreferenced object.

* * * * *